(12) United States Patent
Sasaki et al.

(10) Patent No.: US 12,305,363 B2
(45) Date of Patent: May 20, 2025

(54) REMOTE OPERATION ASSISTANCE SERVER, REMOTE OPERATION ASSISTANCE SYSTEM, AND REMOTE OPERATION ASSISTANCE METHOD

(71) Applicant: KOBELCO CONSTRUCTION MACHINERY CO., LTD., Hiroshima (JP)

(72) Inventors: Hitoshi Sasaki, Hiroshima (JP); Seiji Saiki, Hiroshima (JP); Yoichiro Yamazaki, Hiroshima (JP)

(73) Assignee: Kobelco Construction Machinery Co., Ltd, Hiroshima (JP)

( * ) Notice: Subject to any disclaimer, the term of this patent is extended or adjusted under 35 U.S.C. 154(b) by 249 days.

(21) Appl. No.: 17/796,737

(22) PCT Filed: Jan. 12, 2021

(86) PCT No.: PCT/JP2021/000635
§ 371 (c)(1),
(2) Date: Aug. 1, 2022

(87) PCT Pub. No.: WO2021/192491
PCT Pub. Date: Sep. 30, 2021

(65) Prior Publication Data
US 2023/0073325 A1 Mar. 9, 2023

(30) Foreign Application Priority Data

Mar. 23, 2020 (JP) .................................. 2020-051870

(51) Int. Cl.
*E02F 9/00* (2006.01)
*E02F 9/20* (2006.01)
*G05D 1/00* (2006.01)

(52) U.S. Cl.
CPC ............ *E02F 9/205* (2013.01); *E02F 9/2054* (2013.01); *G05D 1/0027* (2013.01); *G05D 1/0038* (2013.01)

(58) Field of Classification Search
None
See application file for complete search history.

(56) References Cited

U.S. PATENT DOCUMENTS

| 2014/0214240 A1 | 7/2014 | Funke et al. |
| 2014/0240506 A1 | 8/2014 | Glover et al. |

(Continued)

FOREIGN PATENT DOCUMENTS

| JP | 2004-173074 A | 6/2004 |
| JP | 2007-184869 A | 7/2007 |

(Continued)

*Primary Examiner* — James M McPherson
(74) *Attorney, Agent, or Firm* — Carrier, Shende & Associates P.C.; Joseph P. Carrier; Jeffrey T. Gedeon

(57) ABSTRACT

There is provided a technology capable of, when a remote operation target through a remote operation apparatus is switched from one work machine to another work machine, making it easy for an operator to respond to an environmental change of the remote operation target. A first work environment image based on first picked-up image data acquired through a work machine image-pickup device 412 of a first work machine which is a current remote operation target of a remote operation apparatus 20 is outputted on a remote output interface 220. In addition, a second work environment image based on second picked-up image data acquired through a work machine image pickup apparatus of a second work machine which is the next remote operation target of the remote operation apparatus 20 is outputted on the remote output interface 220.

6 Claims, 11 Drawing Sheets

(56) References Cited

U.S. PATENT DOCUMENTS

| | | | |
|---|---|---|---|
| 2017/0168501 A1* | 6/2017 | Ogura | G05D 1/0016 |
| 2019/0155237 A1* | 5/2019 | Kean | G05B 19/0423 |
| 2022/0097621 A1* | 3/2022 | Nakamura | E02F 9/2029 |

FOREIGN PATENT DOCUMENTS

| | | |
|---|---|---|
| JP | 2011-009823 A | 1/2011 |
| JP | 2019-176401 A | 10/2019 |
| WO | 2019/172424 A1 | 9/2019 |
| WO | 2019/239858 A1 | 12/2019 |

* cited by examiner

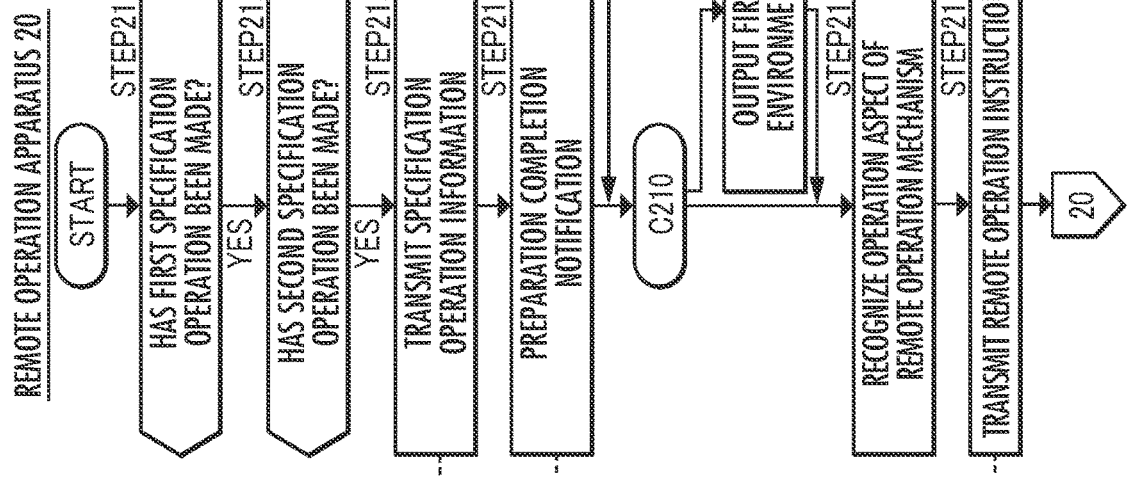
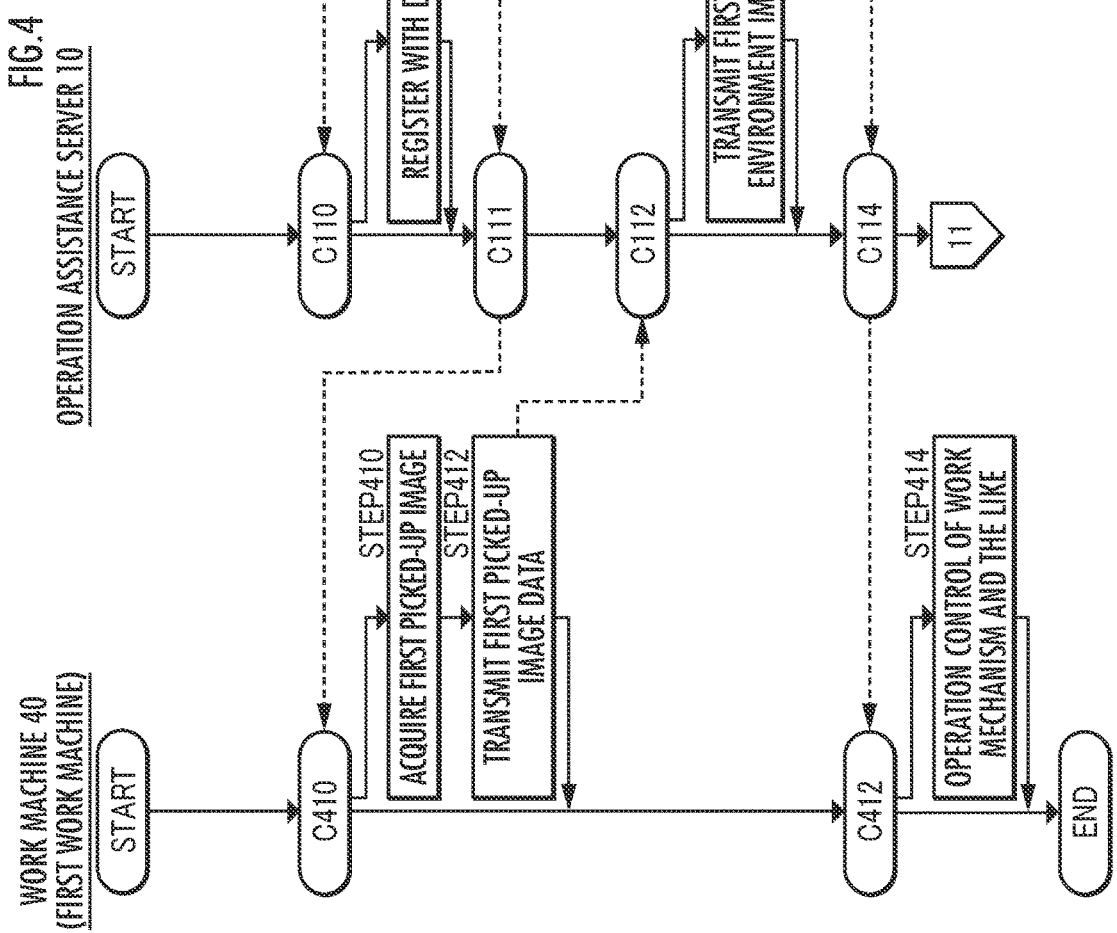
FIG. 4

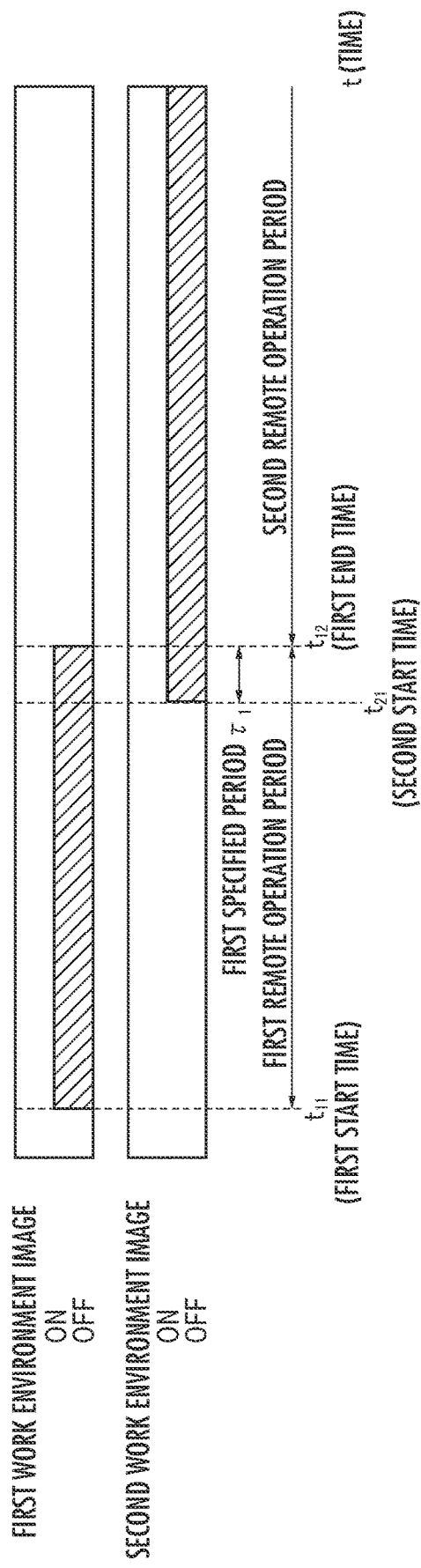

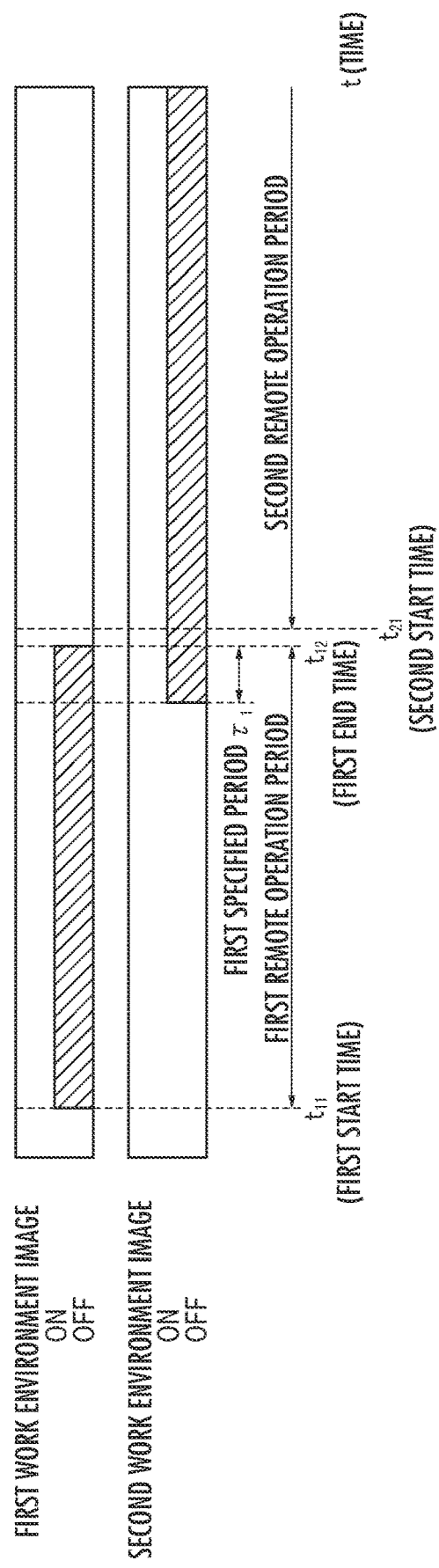

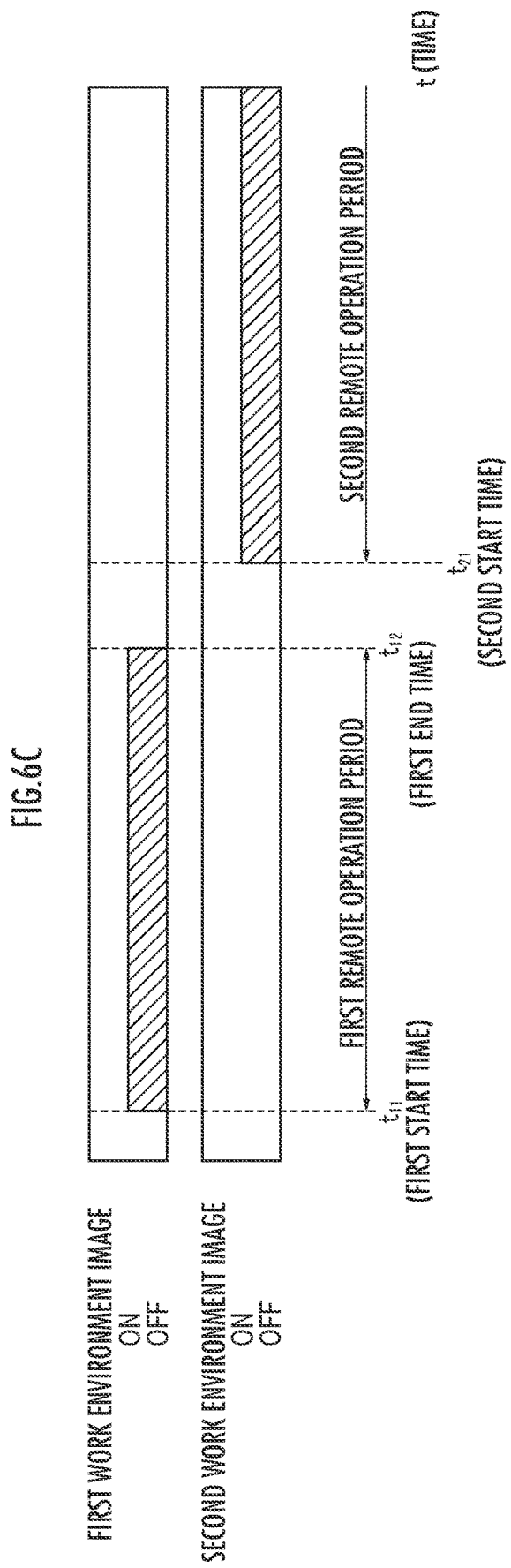

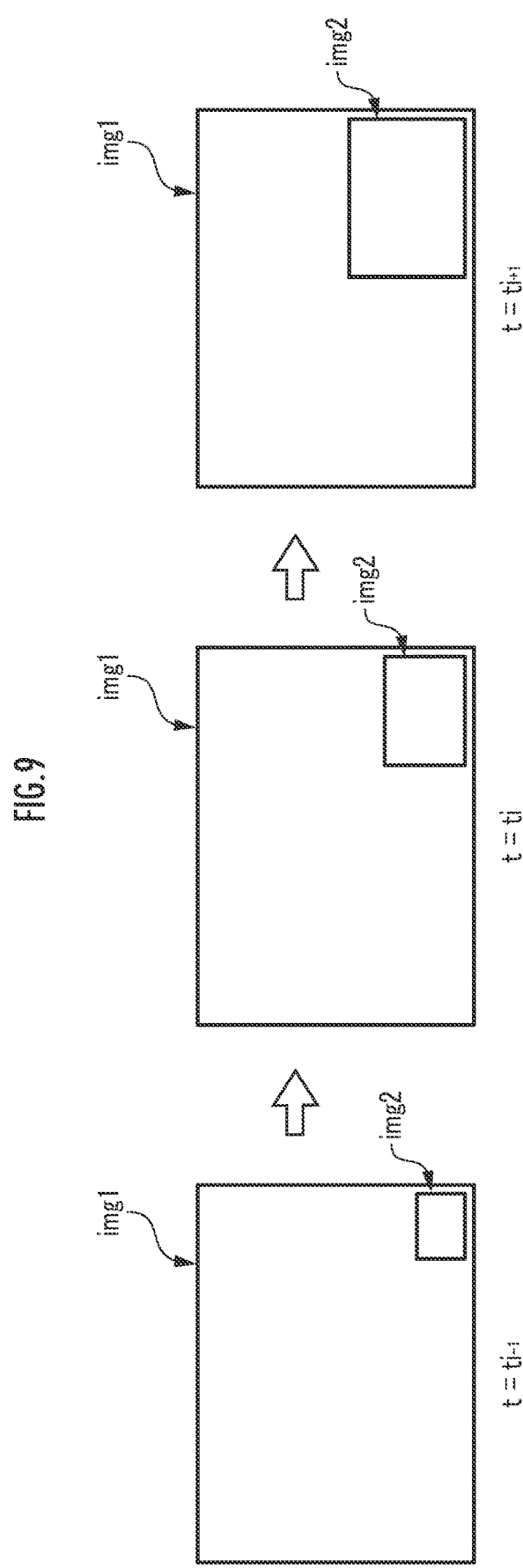

REMOTE OPERATION ASSISTANCE SERVER, REMOTE OPERATION ASSISTANCE SYSTEM, AND REMOTE OPERATION ASSISTANCE METHOD

TECHNICAL FIELD

The present invention relates to a remote operation assistance server for assisting a remote operation of each of a plurality of work machines through a remote operation apparatus by an operator.

BACKGROUND ART

There is proposed a technology for, by causing a picked-up image acquired through a camera (a work machine image pickup apparatus) mounted on a work machine such as a construction machine to be displayed on a monitor constituting a remote operation apparatus, assisting a remote operation of the work machine through the remote operation apparatus (see, for example, Patent Literature 1).

CITATION LIST

Patent Literature

Patent Literature 1: Japanese Patent Laid-Open No. 2019-176401

SUMMARY OF INVENTION

Technical Problem

However, there may be a case where, when a remote operation target through a remote operation apparatus is switched from one work machine to another work machine, it is difficult for an operator to respond to a change from an environment of the one work machine to an environment of the other work machine.

Therefore, an object of the present invention is to provide a technology capable of, when a remote operation target through a remote operation apparatus is switched from one work machine to another work machine, making it easy for an operator to respond to an environmental change of the remote operation target.

Solution to Problem

A remote operation assistance server of the present invention is remote operation assistance server for assisting a remote operation of each of a plurality of work machines through a remote operation apparatus by an operator, the remote operation assistance server comprising:
   a first assistance processing element which recognizes a first work machine which is a current remote operation target of the remote operation apparatus, acquires, based on communication with the first work machine, first picked-up image data indicating a surrounding environment of the first work machine, the first picked-up image data being acquired through a work machine image pickup apparatus mounted on the first work machine or existing around the first work machine, and causes an output interface of the remote operation apparatus to output a first work environment image according to the first picked-up image data based on communication with the remote operation apparatus; and
   a second assistance processing element which recognizes a second work machine which is the next remote operation target of the first work machine of the remote operation apparatus, acquires, based on communication with the second work machine, second picked-up image data indicating a surrounding environment of the second work machine, the second picked-up image data being acquired through a work machine image pickup apparatus mounted on the second work machine or existing around the second work machine, and causes the output interface of the remote operation apparatus to output a second work environment image according to the second picked-up image data together with the first work environment image based on communication with the remote operation apparatus.

According to the remote operation assistance server in the above configuration, the first work environment image based on the first picked-up image data acquired through the work machine image pickup apparatus mounted on or existing around the first work machine which is the current remote operation target of the remote operation apparatus is outputted on the output interface of the remote operation apparatus. In addition, the second work environment image based on the second picked-up image data acquired through the work machine image pickup apparatus mounted on the second work machine or existing around the second work machine which is the next remote operation target of the remote operation apparatus is outputted on the output interface of the remote operation apparatus.

Therefore, it is possible to cause an operator in a state of remotely operating a first work machine through a remote operation apparatus to recognize a surrounding environment of a second work machine which is the next remote operation target in advance. Thereby, it is possible to, when a remote operation target through a remote operation apparatus is switched from one work machine to another work machine, make it easy for an operator to respond to an environmental change of the remote operation target.

BRIEF DESCRIPTION OF DRAWINGS

FIG. 4 is a diagram about a first function of the remote operation assistance system.

FIG. 6A is a first exemplification diagram of an output aspect of first and second work environment images.

FIG. 6B is a second exemplification diagram of the output aspect of the first and second work environment images.

FIG. 6C is a third exemplification diagram of the output aspect of the first and second work environment images.

FIG. 9 is a diagram about a temporal change aspect of the first and second work environment images.

DESCRIPTION OF EMBODIMENTS (Configuration of Operation Assistance System)

Figure 1:
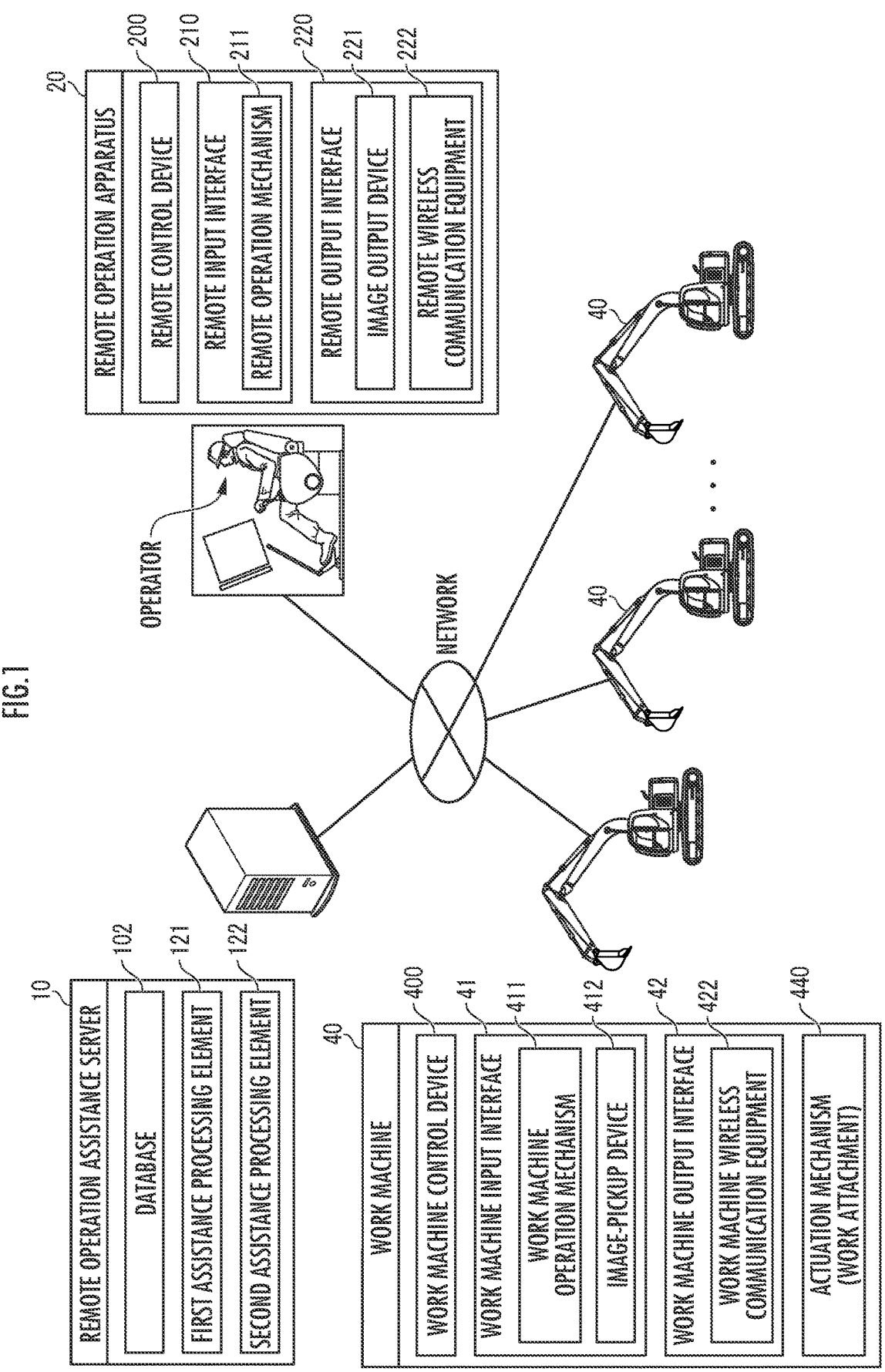
FIG. 1 is a diagram about a configuration of a remote operation assistance system as an embodiment of the present invention.

A remote operation assistance system as an embodiment of the present invention shown in FIG. 1 comprises an operation assistance server 10 and a remote operation apparatus 20 (client) for remotely operating work machines 40. The operation assistance server 10, the remote operation apparatus 20 and the work machine 40 are configured to be capable of mutually performing network communication. A mutual communication network between the operation assistance server 10 and the remote operation apparatus 20 and a mutual communication network between the operation assistance server 10 and the work machines 40 may be the same or may be different.

(Configuration of Operation Assistance Server)

The operation assistance server 10 comprises a database 102, a first assistance processing element 121 and a second assistance processing element 122. The database 102 stores and holds picked-up image data and the like. The database 102 may comprise a database server separate from the operation assistance server 10. Each assistance processing element comprises an arithmetic processing device (a single-core processor, a multi-core processor or a processor core constituting the multi-core processor), and the assistance processing element reads necessary data and software from a storage device such as a memory and executes arithmetic processing described later according to the software for the data.

(Configuration of Remote Operation Apparatus)

The remote operation apparatus 20 comprises a remote control device 200, a remote input interface 210 and a remote output interface 220. The remote operation apparatus 20 functions as at least one of "a first client" and "a second client". The remote control device 200 comprises an arithmetic processing device (a single-core processor, a multi-core processor or a processor core constituting the multi-core processor), and the remote control device 200 reads necessary data and software from a storage device such as a memory and executes arithmetic processing according to the software for the data. The remote input interface 210 comprises a remote operation mechanism 211. The remote output interface 220 comprises an image output device 221 and remote wireless communication equipment 222.

The remote operation mechanism 211 includes a travel operation device, a turning operation device, a boom operation device, an arm operation device and a bucket operation device. Each operation device has an operation lever to receive a rotation operation. The operation lever of the travel operation device (a travel lever) is operated to move a lower travel body 410 of a work machine 40. The travel lever may also serve as a travel pedal. For example, a travel pedal fixed to the base or lower end part of the travel lever may be provided. The operation lever of the turning operation device (a turning lever) is operated to move a hydraulic turning motor constituting a turning mechanism 430 of the work machine 40. The operation lever of the boom operation device (a boom lever) is operated to move a boom cylinder 442 of the work machine 40. The operation lever of the arm operation device (an arm lever) is operated to move an arm cylinder 444 of the work machine 40. The operation lever of the bucket operation device (a bucket lever) is operated to move a bucket cylinder 446 of the work machine 40.

Figure 2:
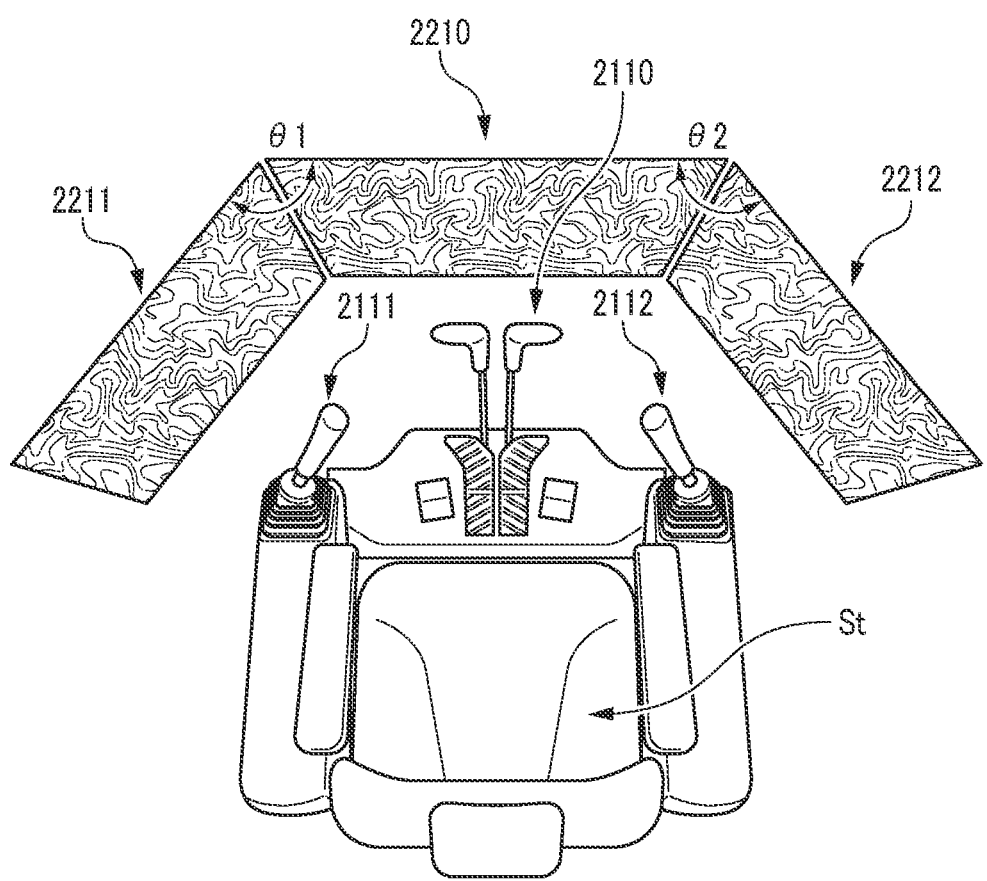
FIG. 2 is a diagram about a configuration of a remote operation apparatus.

The operation levers constituting the remote operation mechanism 211 are arranged, for example, around a seat St for an operator to be seated as shown in FIG. 2. Though the seat St is in a form like a high back chair with armrests, it may be a seating part in an arbitrary form on which an operator can sit, such as a form like a low back chair without a headrest or a form like a chair without a backrest.

In front of the seat St, a pair of left and right travel levers 2110 corresponding to left and right crawlers are arranged left and right, side by side. One operation lever may serve as a plurality of operation levers. For example, a left-side operation lever 2111 provided in front of a left-side frame of the seat St shown in FIG. 2 may function as an arm lever when operated in a front/back direction and function as a turning lever when operated in a left-right direction. Similarly, a right-side operation lever 2112 provided in front of a right-side frame of the seat St shown in FIG. 2 may function as a boom lever when operated in the front/back direction and function as a bucket lever when operated in the left-right direction. The lever patterns may be arbitrarily changed by an operation instruction by an operator.

For example, as shown in FIG. 2, the image output device 221 comprises a central image output device 2210, a left-side image output device 2211 and a right-side image output device 2212 that are arranged in front of, diagonally forward left of and diagonally forward right of the seat St, respectively, each of the image output devices having an almost rectangular-shaped screen. The shapes and sizes of the screens (image display areas) of the central image output device 2210, the left-side image output device 2211 and the right-side image output device 2212 may be the same or may be different.

As shown in FIG. 2, the right edge of the left-side image output device 2211 adjoins the left edge of the central image output device 2210 such that the screen of the central image output device 2210 and the screen of the left-side image output device 2211 form a tilt angle θ1 (for example, 120°≤θ1≤150°). As shown in FIG. 2, the left edge of the right-side image output device 2212 adjoins the right edge of the central image output device 2210 such that the screen of the central image output device 2210 and the screen of the right-side image output device 2212 form a tilt angle θ2 (for example, 120°≤θ2≤150°). The tilt angles θ1 and θ2 may be the same or different.

Each of the screens of the central image output device 2210, the left-side image output device 2211 and the right-side image output device 2212 may be parallel to the vertical direction or may be inclined relative to the vertical direction. At least one image output device among the central image output device 2210, the left-side image output device 2211 and the right-side image output device 2212 may comprise a plurality of divided image output devices. For example, the central image output device 2210 may comprise a pair of image output devices that vertically adjoin each other, each of the image output devices having an almost rectangular-shaped screen. Each of the image output devices 2210 to 2212 may further comprise a speaker (a voice output device).

(Configuration of Work Machine)

The work machine 40 comprises a work machine control device 400, a work machine input interface 41, a work machine output interface 42 and an actuation mechanism 440. The work machine control device 400 comprises an arithmetic processing device (a single-core processor, a multi-core processor or a processor core constituting the multi-core processor), and the work machine control device 400 reads necessary data and software from a storage device such as a memory and executes arithmetic processing according to the software for the data.

Figure 3:
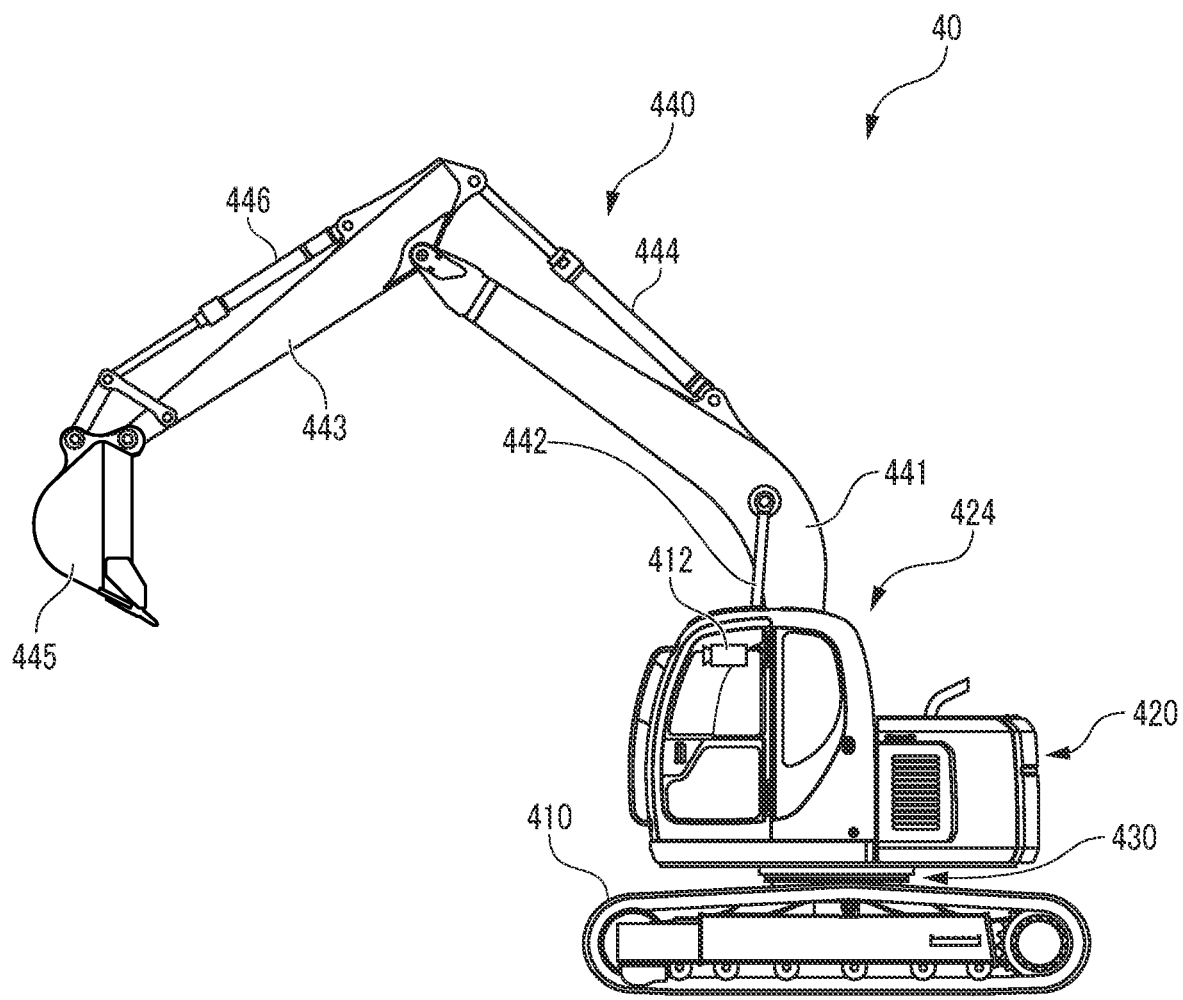
FIG. 3 is a diagram about a configuration of a work machine.

The work machine 40 is, for example, a crawler shovel (a construction machine) and comprises the crawler-type lower travel body 410, an upper turning body 420 that is turnably mounted on the lower travel body 410 via the turning mechanism 430 as shown in FIG. 3. On the front left side part of the upper turning body 420, a cab 424 (a driving room) is provided. On the front center part of the upper turning body 420, the work mechanism 440 is provided.

The work machine input interface 41 comprises a work machine operation mechanism 411 and a work machine image-pickup device 412. The work machine operation mechanism 411 comprises a plurality of operation levers arranged similarly to those of the remote operation mechanism 211 around a seat arranged inside the cab 424. A driving mechanism or robot that receives a signal corresponding to an operation aspect of a remote operation lever and moves a work machine operation lever based on the received signal is provided in the cab 424. The work machine image-pickup device 412 is installed, for example, inside the cab 424 and picks up an image of an environment that includes at least a part of the actuation mechanism 440 through a front window and a pair of left and right side windows. A part or all of the front window and side windows may be omitted. The work machine image-pickup device 412 may be arranged around the work machine 40. The work machine image-pickup device 412 may be mounted on a movable body capable of moving around the work machine 40 such as an unmanned vehicle or an unmanned airplane.

The work machine output interface 42 comprises work machine wireless communication equipment 422.

The work mechanism 440 as an actuation mechanism comprises a boom 441 fitted to the upper turning body 420 in a manner of being capable of being raised, an arm 443 rotatably coupled with the tip of the boom 441 and a bucket 445 rotatably coupled with the tip of the arm 443. The boom cylinder 442, the arm cylinder 444 and the bucket cylinder 446 that comprise telescopic hydraulic cylinders, respectively, are fitted to the work mechanism 440.

The boom cylinder 442 is interposed between the boom 441 and the upper turning body 420 so as to, by extending and retracting by receiving supply of hydraulic oil, cause the boom 441 to rotate in a direction of being raised. The arm cylinder 444 is interposed between the arm 443 and the boom 441 so as to, by extending and retracting by receiving supply of hydraulic oil, cause the arm 443 to rotate around a horizontal axis relative to the boom 441. The bucket cylinder 446 is interposed between the bucket 445 and the arm 443 so as to, by extending and retracting by receiving supply of hydraulic oil, cause the bucket 445 to rotate around a horizontal axis relative to the arm 443.

(First Function)

A first function of the operation assistance system in the above configuration will be described using a flowchart shown in FIG. 4. In the flowchart, each block indicated by "C" is used to simplify description, means transmission and/or reception of data and means such a conditional branch that processing in a branch direction is executed under the condition of transmission and/or reception of the data.

In a remote operation apparatus 20 as a first remote operation apparatus, it is determined whether a first specification operation from an operator through the remote input interface 210 has been performed or not (FIG. 4/STEP 211). The "first specification operation" is, for example, an operation such as tapping or swiping on the remote input interface 210 for specifying a work machine 40 that the operator intends to remotely operate.

If a result of the determination is negative (FIG. 4/STEP 211: NO), a determination process about whether the first specification operation has been performed or not (FIG. 4/STEP 211) is repeated. On the other hand, if the result of the determination is positive (FIG. 4/STEP 211: YES), it is determined whether a second specification operation from an operator through the remote input interface 210 has been performed or not in the remote operation apparatus 20 as the first remote operation apparatus (FIG. 4/STEP 212). The "second specification operation" is, for example, an operation such as key touching, tapping or swiping on the remote input interface 210 for setting a schedule including scheduled start time and/or scheduled end time of a remote operation of the work machine 40 specified by the first specification operation. This schedule may be registered with the database 102 in advance. The schedule may be set by a terminal apparatus such as a smartphone, a tablet terminal or a personal computer.

If a result of the determination is negative (FIG. 4/STEP 212: NO), a process of and after the determination about whether the first specification operation has been performed or not (FIG. 4/STEP 211) is repeated. On the other hand, if the result of the determination is positive (FIG. 4/STEP 212: YES), specification operation information is transmitted to the remote operation assistance server 10 through the remote wireless communication equipment 222 (FIG. 4/STEP 213). The specification operation information includes a remote identifier for identifying the remote operation apparatus 20, a work machine identifier for identifying the work machine 40 specified by the first specification operation, the schedule including the scheduled start time and the scheduled end time of the remote operation, which has been set by the second specification operation.

By the first specification operation and the second specification operation, not only one work machine 40 but also a plurality of work machines 40 can be specified. In the present embodiment, description will be made on a case where two work machines 40, a first work machine and a second work machine, are specified by the first specification operation, and scheduled end time of the first work machine (first scheduled end time $t_{12}$) and scheduled start time of the second work machine (second scheduled start time $t_{21}$ are set by the second specification operation.

In the remote operation assistance server 10, when the specification operation information is received (FIG. 4/C110), the specification operation information is registered with the database 102 (FIG. 4/STEP 110).

In the remote operation apparatus 20, a preparation completion notification to the effect that preparation for the remote operation has been made is transmitted to the remote operation assistance server 10 via the remote wireless communication equipment 222 in responses to a specified trigger (FIG. 4/STEP 214). As the specified trigger, the operator pressing a preparation completion button that constitutes the remote input interface 210, the operator being seated on the seat St, or the like is detected. However, when the specified trigger occurs earlier than a predetermined time (for example, 10 minutes) before the second scheduled start time $t_{21}$, the preparation completion notification may not be transmitted. The preparation completion notification includes the remote identifier.

In the remote operation assistance server 10, when the preparation completion notification is received, a first environment confirmation request is transmitted to the work machine 40 identified by the work machine identifier that is stored and hold in or registered with the database 102 in association with the remote identifier included in the preparation completion notification, by the first assistance processing element 121 (FIG. 4/C111).

In the work machine 40 as a first work machine, when the first environment confirmation request is received through the work machine wireless communication equipment 422 (FIG. 4/C410), the work machine control device 400 acquires a picked-up image through the work machine image-pickup device 412 as a first picked-up image (FIG. 4/STEP 410). First picked-up image data indicating the first picked-up image is transmitted to the remote operation server 10 by the work machine control device 400 through the work machine wireless communication equipment 422 (FIG. 4/STEP 412).

In the operation assistance server 10, when the first picked-up image data is received (FIG. 4/C112), first work environment image data is transmitted to the remote operation apparatus 20 by the first assistance processing element 121 (FIG. 4/STEP 112). The first work environment image data includes, in addition to the first picked-up image data itself, image data indicating a simulated work environment image generated based on the first picked-up image.

In the remote operation apparatus 20, when the first work environment image data is received through the remote wireless communication equipment 222 (FIG. 4/C210), a first work environment image corresponding to the first work environment image data is outputted on the image output device 221 by the remote control device 200 (FIG. 4/STEP 215).

Figure 7A:
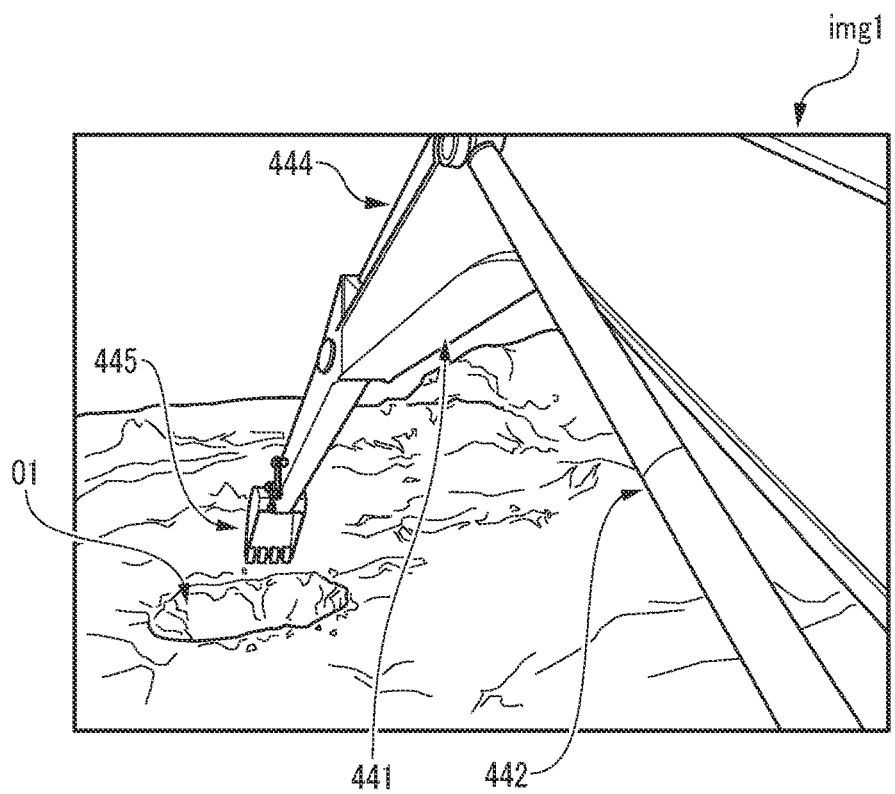
FIG. 7A is a diagram about an output aspect of a first work environment image.

Thereby, as shown in each of FIG. 6A and FIG. 6B, the first work environment image is continuously outputted on the image output device 221 from scheduled start time $t_{11}$ to the scheduled end time $t_{12}$ of a first remote operation period. For example, as shown in FIG. 7A, a first work environment image Img1 with the boom 441, the arm 443 and the bucket 445, which are parts of the work mechanism 440 of the work machine 40 as the first work machine, being reflected therein is outputted on the image output device 221.

In the remote operation apparatus 20, an operation aspect of the remote operation mechanism 211 is recognized by the remote control device 200 (FIG. 4/STEP 216), and a remote operation instruction corresponding to the operation aspect is transmitted to the operation assistance server 10 through the remote wireless communication equipment 222 (FIG. 4/STEP 217). The operation aspect may not be recognized until the first scheduled start time comes, or the remote operation instruction may not be transmitted to the remote operation assistance server 10 even if the operation aspect is recognized.

In the operation assistance server 10, when the remote operation instruction is received, the remote operation instruction is transmitted to the work machine 40 as the first work machine by the first assistance processing element 121 (FIG. 4/C114).

In the work machine 40 as the first work machine, when the operation instruction is received by the work machine control device 400 through the work machine wireless communication equipment 422 (FIG. 4/C412), operations of the work mechanism 440 and the like are controlled (FIG. 4/STEP 414). Thereby, for example, as shown in FIG. 7A, work of scooping dirt in an area O1 in front of the work machine 40 by the bucket 445, causing the upper turning body 420 to turn and dropping the dirt from the bucket 445 onto another place is executed.

(Second Function)

A second function of the operation assistance system in the above configuration will be described using a flowchart shown in FIG. 5. In the flowchart, each block indicated by "C●" is also used to simplify description, means transmission and/or reception of data, and means such a conditional branch that processing in a branch direction is executed under the condition of transmission and/or reception of the data.

Figure 5:
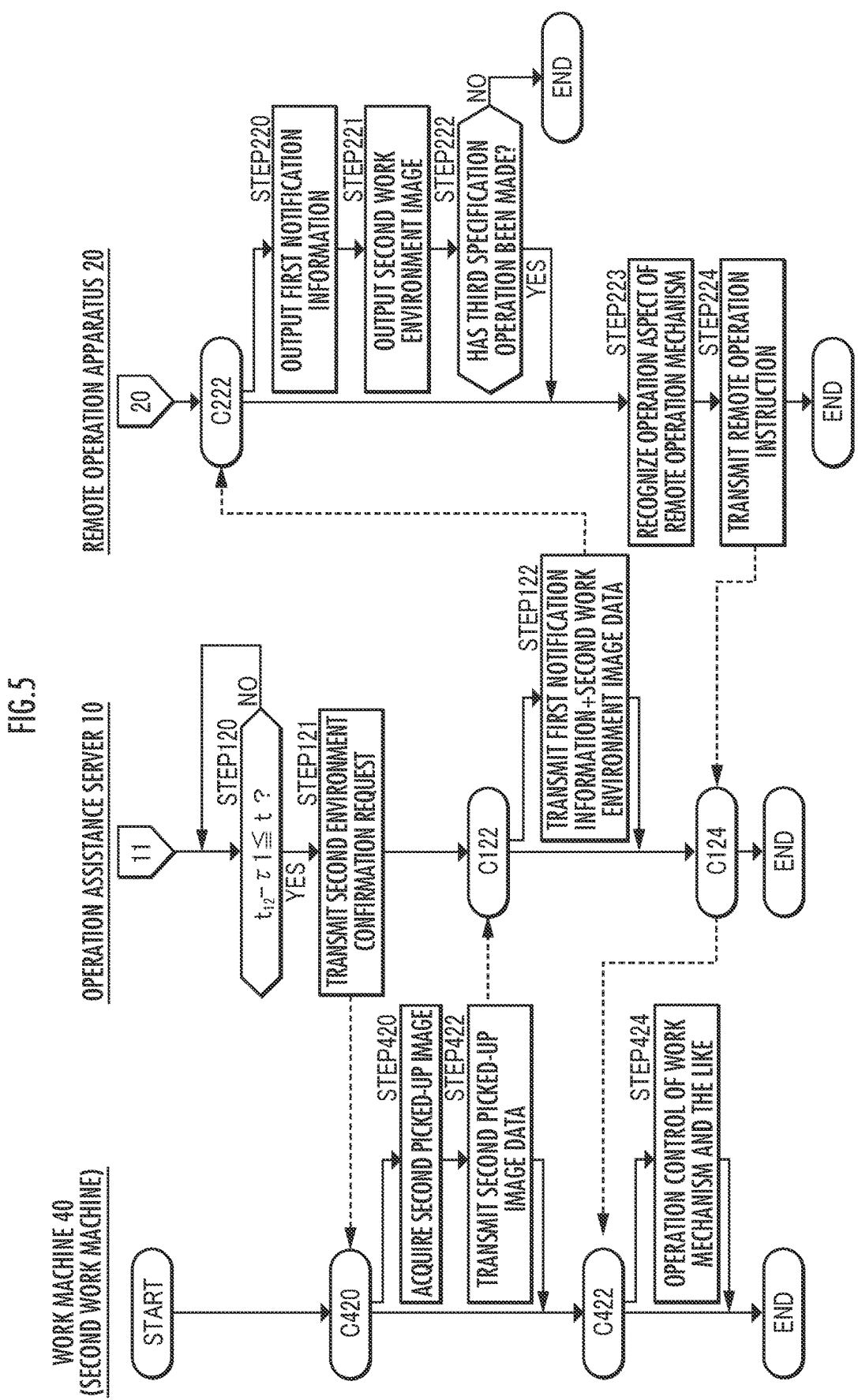
FIG. 5 is a diagram about a second function of the remote operation assistance system.

In the remote operation assistance server 10, it is determined by the second assistance processing element 122 whether or not current time t is time that is a first specified period $\tau_1$ before the scheduled start time $t_{21}$ of a second remote operation period or after the time (FIG. 5/STEP 120). That is, it is determined whether or not a first time interval, which is a time interval from the current time t to the scheduled start time $t_{21}$ of the second remote operation period, is equal to or shorter than a first specified period $\tau_1$. The "second remote operation period" is a period or a scheduled period during which the second work machine is remotely operated by the remote operation apparatus 20.

If a result of the determination is negative (FIG. 5/STEP 120: NO), the determination process is repeated (FIG. 5/STEP 120).

On the other hand, if the result of the determination is positive (FIG. 5/STEP 120: YES), a second environment confirmation request is transmitted to the work machine 40 as the second work machine identified by a second work machine identifier by the second assistance processing element 122 (FIG. 5/STEP 121).

In the work machine 40 as the second work machine, when the second environment confirmation request is received through the work machine wireless communication equipment 422 (FIG. 5/C420), the work machine control device 400 acquires a picked-up image through the work machine image-pickup device 412 as a second picked-up image (FIG. 5/STEP 420). Second picked-up image data indicating the second picked-up image is transmitted to the remote operation device 10 by the work machine control server 400 through the work machine wireless communication equipment 422 (FIG. 5/STEP 422).

In the operation assistance server 10, when the second picked-up image data is received (FIG. 5/C122), first notification information and second work environment image data are transmitted to the remote operation apparatus 20 by the second assistance processing element 122 (FIG. 5/STEP 122). The "second work environment image data" includes, in addition to the second picked-up image data itself, image data indicating a simulated work environment image generated based on the second picked-up image. The "first notification information" is a notification to the effect that the time interval from the current time t to the scheduled start time $t_{21}$ of the second remote operation period is equal to or shorter than the first specified period $\tau_1$, and start of an operation of the second work machine approaches. The first notification information is transmitted at time $t=t_{21}-\tau_1$. If, when the second work machine is operated by another operator during the first remote operation period, and the work by the other operator ends earlier than scheduled, the "first notification information" may be notified at time before the scheduled start time $t_{21}$ of the second remote operation period. If, when the second work machine is operated by another operator during the first remote operation period, and the work by the other operator is delayed and continued until after the scheduled start time $t_{21}$ set by the operator, the first notification information is transmitted at the time $t=t_{21}-\tau_1$.

In the remote operation apparatus 20, when the first notification information and the second work environment image data are received through the remote wireless communication equipment 222 (FIG. 5/C222), the first notification information is outputted on the image output device 221 by the remote control device 200 (FIG. 5/STEP 220). Further, in this case, a second work environment image corresponding to the second work environment image data is outputted on the image output device 221 by the remote control device 200 (FIG. 5/STEP 221).

Figure 7B:
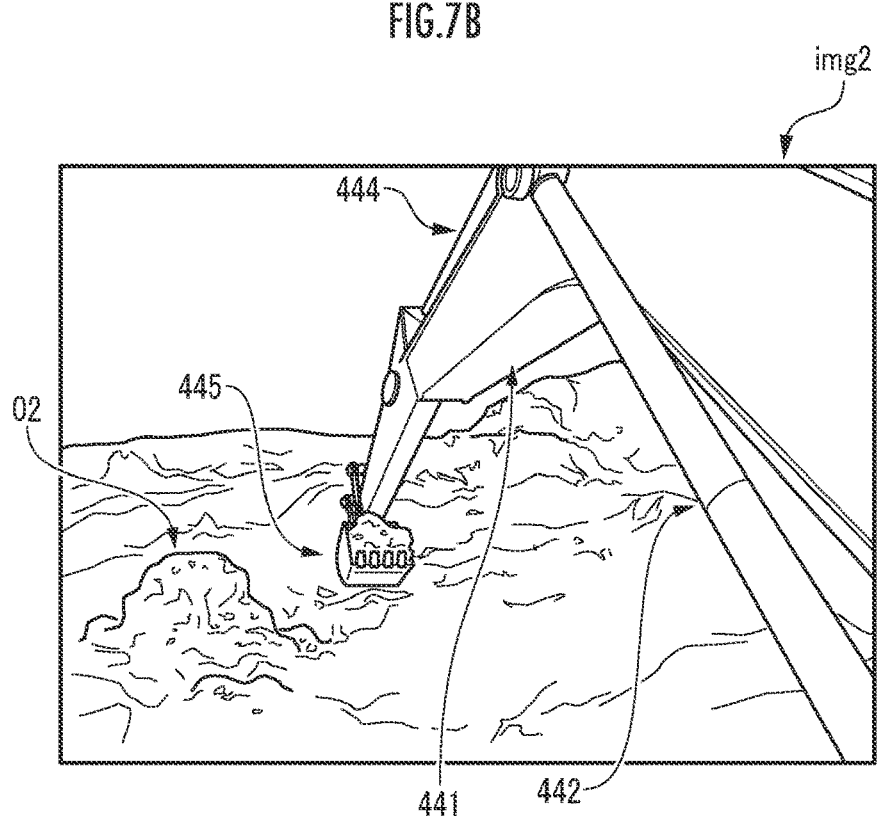
FIG. 7B is a diagram about an output aspect of a second work environment image.

Thereby, as shown in FIG. 6A, the second work environment image is continuously outputted on the image output device 221 from the time $t=t_{21}-\tau_1$ to the scheduled end time $t_{12}$ of the first remote operation period. That is, as shown in FIG. 6A, in addition to the first work environment image, the second work environment image is continuously outputted on the image output device 221 from the time $t=t_{21}-\tau_1$ to the scheduled end time $t_{12}$ of the first remote operation period. For example, as shown in FIG. 7B, a second work environment image Img2 with the boom 441, the arm 443 and the bucket 445, which are parts of the work mechanism 440 of the work machine 40 as the second work machine, being reflected therein is outputted on the image output device 221.

If a time interval from the scheduled end time $t_{12}$ of the first remote operation period to the scheduled start time $t_{21}$ of the second remote operation period is slightly shorter than the first specified period $\tau_1$, the second work environment image Img2 is continuously outputted on the image output device 221 from the time $t=t_{21}-\tau_1$ as shown in FIG. 6B. In this case, as shown in FIG. 6B, a period during which both of the first work environment image Img1 and the second work environment image Img2 can be outputted on the image output device 221 is shorter than the first specified period $\tau_1$.

Whether or not to output the second work environment image on the image output device 221 may be arbitrarily controlled. For example, a widget of the second work environment image may be displayed on an end part of the image output device 221 so that, when the operator develops the widget by a button constituting the remote input interface 210, the second work environment image may be outputted on the image output device 221. After the second work environment image is displayed, the operator may perform an operation so that the second work environment image is not outputted, by a button constituting the remote input interface 210. In any case, it is possible to confirm the state of the second work machine while operating the first work machine.

As shown in FIG. 6C, if the time interval from the scheduled end time $t_{12}$ of the first remote operation period to the scheduled start time $t_{21}$ of the second remote operation period is equal to or longer than the first specified period $\tau_1$, both of the first environment image Img1 and the second environment image Img2 are not displayed on the image output device 221 at the same time.

Figure 8:
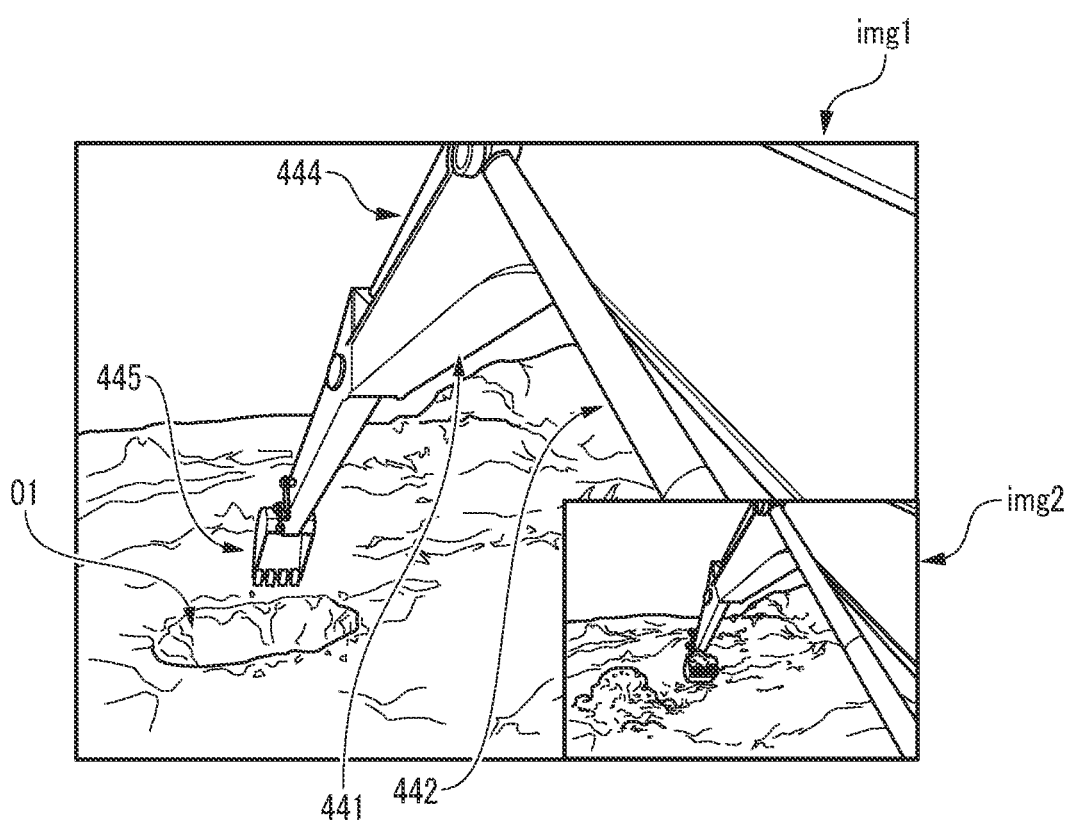
FIG. 8 is a diagram about an output aspect of the first and second work environment images.

The first work environment image Img1 (see FIG. 7A) and the second work environment image Img2 (see FIG. 7B) may be outputted on the image output device 221 (for example, two image output devices among the central image output device 2210, the left-side image output device 2211 and the right-side image output device 2212) separately or being separated from each other. As shown in FIG. 8, the first work environment image Img1 (see FIG. 7A) and the second work environment image Img2 (see FIG. 7B) may be outputted on the image output device 221 (for example, one image output devices among the central image output device 2210, the left-side image output device 2211 and the right-side image output device 2212) being overlapped. At this time, the size and arrangement aspect of the second work environment image Img2 may be such that the second work environment image Img2 does not overlap with the work mechanism 440 reflected in the first work environment image Img1.

The first work environment image and the second work environment image may be outputted on the image output device 221 such that, as the scheduled end time of a first work environment image output period (see, for example, FIG. 6A and FIG. 6B/time $t_{12}$) approaches, the second work environment image is relatively larger than the first work environment image on the image output device 221 constituting the remote output interface 220, by the second assistance processing element 122 based on communication with the remote operation apparatus 20. For example, as shown in FIG. 9, control may be performed so that the size of the second environment image Img2 overlapping with the first environment image Img1 gradually increases in the process of the time t changing as $t_{i-1} \to t_i \to t_{i+1}$.

In the remote operation apparatus 20 as the first remote operation apparatus, it is determined whether a third specification operation from the operator through the remote input interface 210 has been performed or not (FIG. 5/STEP 222). The "third specification operation" is, for example, an operation such as tapping or swiping on the remote input interface 210 for switching the work machine 40 that the operator intends to remotely operate from the first work machine to the second work machine.

If a result of the determination is negative (FIG. 5/STEP 222: NO), the series of processes ends. On the other hand, if the result of the determination is positive (FIG. 5/STEP 222: YES), an operation aspect of the remote operation mechanism 211 is recognized by the remote control device 200 (FIG. 5/STEP 223), and a remote operation instruction corresponding to the operation aspect is transmitted to the operation assistance server 10 through the remote wireless communication equipment 222 (FIG. 5/STEP 224) in the remote operation apparatus 20.

As shown in each of FIG. 6A and FIG. 6B, the second work environment image is continuously outputted on the image output device 221 of the remote operation apparatus 20 at and after the scheduled start time $t_{21}$ of the second remote operation period. The "second remote operation period" is a period or a scheduled period during which the second work machine is remotely operated by the remote operation apparatus 20. Operations of the work mechanism 440 and the like of the work machine 40 as the second work machine are controlled according to the operation aspect of the remote operation mechanism 211 in the remote operation apparatus 20.

In the operation assistance server 10, when the remote operation instruction is received, the remote operation instruction is transmitted to the work machine 40 as the second work machine by the first assistance processing element 121 (FIG. 5/C124).

In the work machine 40 as the second work machine, when the operation instruction is received by the work machine control device 400 through the work machine wireless communication equipment 422 (FIG. 5/C422), operations of the work mechanism 440 and the like are controlled (FIG. 5/STEP 424). Thereby, for example, as shown in FIG. 7B, work of scooping piled dirt in an area O2 in front of the work machine 40 by the bucket 445, causing the upper turning body 420 to turn and dropping the dirt from the bucket 445 onto another place is executed.

(Effect)

According to the remote operation assistance system in the above configuration or the remote operation assistance server 10 constituting the remote operation assistance system, the first work environment image based on the first picked-up image data acquired through the work machine image-pickup device 412 that is mounted on (or existing around) the work machine 40 as the first work machine which is the current remote operation target of the remote operation apparatus 20 is outputted on the image output device 221 constituting the remote output interface 220 (see FIG. 4/STEP 410→STEP 412→C112→STEP 112→C210→STEP 215, and FIG. 7A).

In addition, the second work environment image based on the second picked-up image data acquired through the work machine image-pickup device that is mounted on (or existing around) the work machine 40 as the second work machine which is the next remote operation target of the remote operation apparatus 20 is outputted on the image output device 221 constituting the remote output interface 220 (see FIG. 5/STEP 420→STEP 422→C122→STEP 122→C222→ . . . →STEP 221, and FIG. 7B and FIG. 8).

The second assistance processing element 122 causes the remote output interface 220 of the remote operation apparatus 20 to output the second work environment image together with the first work environment image on condition that the first time interval from the current time t to the scheduled start time $t_{21}$ of the second remote operation period during which the second work machine is remotely operated by the remote operation apparatus 20 is equal to or shorter than the first specified period $\tau_1$.

The second assistance processing element 122 causes the remote output interface 220 of the remote operation apparatus 20 to output the first notification information to the effect that the first time interval is equal to or shorter than the first specified period $\tau_1$ based on communication with the remote operation apparatus 20.

The second work environment image is outputted on the image output device 221 constituting the remote output interface 220 of the remote operation apparatus 20 together with the first environment image on condition that the time interval from the current time t to the scheduled start time $t_{21}$ of the second remote operation period is equal to or shorter than the first specified period $\tau_1$ (see FIG. 5/STEP 120: YES→ . . . →STEP 224, and FIG. 6A and FIG. 6B).

Therefore, it is possible to cause the operator in the state of remotely operating the first work machine through the remote operation apparatus 20 to recognize the surrounding environment of the second work machine which is the next remote operation target in advance (see FIG. 6A/period from time $t_{11}$ to time $t_{12}$, FIG. 6B/period from time $t_{12}-\tau_1$ to time $t_{12}$, and FIG. 7B and FIG. 8). Thereby, it is possible to, when a remote operation target through a remote operation apparatus 20 is switched from one work machine 40 to another work machine 40, make it easy for an operator to respond to an environmental change of the remote operation target.

For example, it is possible to avoid the second work environment image from being outputted on the remote output interface 220 together with the first work environment image for an excessively long time. Therefore, it is possible to make it easy for an operator to respond to an environmental change of a remote operation target while avoiding a situation in which the operator's attention to the first work environment image is interrupted by the second work environment image.

The second assistance processing element 122 causes the remote output interface 220 of a remote operation apparatus 20 to output the first work environment image and the second work environment image such that, as the scheduled start time of the second remote operation period approaches, the second work environment image is relatively larger than the first work environment image on the remote output interface 220 of the remote operation apparatus 20, based on communication with the remote operation apparatus 20.

According to the remote operation assistance server in the above configuration, the two work environment images are outputted on the remote output interface 220 such that, as the scheduled end time of the first work environment image output period approaches, the second work environment image is continuously or gradually relatively larger than the first work environment image on the remote output interface 220 of the remote operation apparatus 20. Therefore, it is possible to, when a remote operation target through a remote operation apparatus 20 is switched from one work machine to another work machine, cause an operators attention to gradually shift from the one work machine to the other work machine and, as a result, make the switching of the remote operation target smooth.

Other Embodiments of the Present Invention

If the first notification information is notified at time before the scheduled start time $t_{21}$ of the second remote operation period (see FIG. 5/C222), "the first notification information" and "the second work environment image data" may be received at time before the time $t=t_{21}-\tau_1$. It is also possible for only "the first notification information" to be outputted on the image output device 221 (see FIG. 5/STEP 220) and for the second work environment image to be outputted on the image output device 221 in addition to the first work environment image that has been outputted so far when the time $t=t_{21}-\tau_1$ comes (see FIG. 5/STEP 221). It is also possible for only "the first notification information" to be outputted on the image output device 221 and for the second work environment image to be outputted on the image output device 221 when the operator operates a button constituting the remote input interface 210 during a period before the time $t=t_{21}-\tau_1$ comes. Further, after the second work environment image is outputted on the image output device 221, the operator may operate a button constituting the remote input interface 210 so that the second work environment image is not outputted.

If, in a situation in which the second work machine is remotely operated by another operator on a remote operation apparatus 20 as a second remote operation apparatus, it is expected that the work by the other operator is delayed and continued until after the scheduled start time $t_{21}$ set by the operator, "the first notification information" and "the second work environment image data" may be received at the time $t=t_{21}-\tau_1$. Only "the first notification information" may be outputted on the image output device 221 (see FIG. 5/STEP 220), and it may be outputted on the image output device 221 that an operation is not possible or delayed (see FIG. 5/STEP 221). When the work by the other operator ends, the second work environment image may be outputted on the image output device 221 in addition to the first work environment image that has been outputted so far. In a state in which only "the first notification information" is outputted on the image output device 221, the second work environment image may be outputted on the image output device 221 when the operator operates a button constituting the remote input interface 210. Further, after the second work environment image is outputted on the image output device 221, the operator may operate a button constituting the remote input interface 210 so that the second work environment image is not outputted.

The second assistance processing element 122 causes the output interface 220 of the remote operation apparatus 20 to output the second work environment image together with the first work environment image even after the first remote operation period ends, based on communication with the remote operation apparatus 20.

In this case, even if the timing of the first specification operation is delayed, a period during which the second work environment image is outputted on the remote output interface 220 in addition to the first work environment image is secured even after the first remote operation period ends. Therefore, it is possible to, when a remote operation target through a remote operation apparatus 20 is switched from one work machine to another work machine, make it easy for an operator to respond to an environmental change of the remote operation target.

REFERENCE SIGNS LIST

10 Operation assistance server
20 Remote operation apparatus
40 Work machine
102 Database
121 First assistance processing element
122 Second assistance processing element
200 Remote control device
210 Remote input interface
211 Remote operation mechanism
220 Remote output interface
221 Image output device
400 Work machine control device
410 Lower travel body
420 Upper turning body
424 Cab (driving room)
440 Work mechanism (actuation mechanism)
445 Bucket (work unit)

The invention claimed is:

1. A remote operation assistance server for assisting a remote operation of each of a plurality of work machines through a remote operation apparatus by an operator, the remote operation assistance server comprising:
a first assistance processing element which recognizes a first work machine which is a current remote operation target of the remote operation apparatus, acquires, based on communication with the first work machine, first picked-up image data indicating a surrounding environment of the first work machine, the first picked-up image data being acquired through a work machine image pickup apparatus mounted on the first work machine or existing around the first work machine, and causes an output interface of the remote operation apparatus to output a first work environment image according to the first picked-up image data based on communication with the remote operation apparatus; and
a second assistance processing element which recognizes a second work machine specified in advance which is a next remote operation target of the first work machine of the remote operation apparatus, acquires, based on communication with the second work machine, second picked-up image data indicating a surrounding environment of the second work machine, the second picked-up image data being acquired through a work machine image pickup apparatus mounted on the second work machine or existing around the second work machine, and causes the output interface of the remote operation apparatus to output a second work environment image according to the second picked-up image data together with the first work environment image based on communication with the remote operation apparatus,
wherein the second assistance processing element further causes the output interface of the remote operation apparatus to output the second work environment image together with the first work environment image on condition that a first time interval from current time to scheduled start time of a second remote operation period during which the second work machine is remotely operated by the remote operation apparatus is equal to or shorter than a first specified period.

2. The remote operation assistance server according to claim 1, wherein the second assistance processing element causes the output interface of the remote operation apparatus to output first notification information to an effect that the first time interval is equal to or shorter than the first specified period based on communication with the remote operation apparatus.

3. The remote operation assistance server according to claim 2, wherein the second assistance processing element causes the output interface of the remote operation apparatus to output the second work environment image together with the first work environment image even after the first remote operation period ends, based on communication with the remote operation apparatus.

4. The remote operation assistance server according to claim 1, wherein the second assistance processing element causes the output interface of the remote operation apparatus to output the first work environment image and the second work environment image such that, as the scheduled start time of the second remote operation period approaches, the second work environment image is relatively larger than the first work environment image on the output interface of the remote operation apparatus, based on communication with the remote operation apparatus.

5. A remote operation assistance system comprising the remote operation assistance server according to claim 1 and clients.

6. A remote operation assistance method for assisting a remote operation of each of a plurality of work machines through a remote operation apparatus by an operator, the remote operation assistance method executing:
a first assistance process for recognizing a first work machine which is a current remote operation target of the remote operation apparatus, acquiring, based on communication with the first work machine, first picked-up image data indicating a surrounding environment of the first work machine, the first picked-up image data being acquired through a work machine image pickup apparatus mounted on the first work machine or existing around the first work machine, and causing an output interface of the remote operation apparatus to output a first work environment image according to the first picked-up image data based on communication with the remote operation apparatus; and
a second assistance process for recognizing a second work machine specified in advance which is a next remote operation target of the first work machine of the remote operation apparatus, acquiring, based on communication with the second work machine, second picked-up image data indicating a surrounding environment of the second work machine, the second picked-up image data being acquired through a work machine image pickup apparatus mounted on the second work machine or existing around the second work machine, and causing the output interface of the remote operation apparatus to output a second work environment image according to the second picked-up image data together with the first work environment image based on communication with the remote operation apparatus, wherein the second assistance process further causes the output interface of the remote operation apparatus to output the second work environment image together with the first work environment image on condition that a first time interval from current time to scheduled start time of a second remote operation period during which the second work machine is remotely operated by the remote operation apparatus is equal to or shorter than a first specified period.

* * * * *